US008732211B2

(12) United States Patent
Acuna et al.

(10) Patent No.: US 8,732,211 B2
(45) Date of Patent: May 20, 2014

(54) METHOD, COMPUTER SYSTEM, AND PHYSICAL COMPUTER STORAGE MEDIUM FOR ORGANIZING DATA INTO DATA STRUCTURES

(75) Inventors: Jorge D. Acuna, Vail, AZ (US); Ezequiel Cervantes, Tucson, AZ (US); Nedzad Taljanovic, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 254 days.

(21) Appl. No.: 13/016,430

(22) Filed: Jan. 28, 2011

(65) Prior Publication Data
US 2012/0197943 A1 Aug. 2, 2012

(51) Int. Cl.
*G06F 17/30* (2006.01)

(52) U.S. Cl.
USPC .................................................. 707/803

(58) Field of Classification Search
USPC .................... 707/796, 999.104, 803
See application file for complete search history.

(56) References Cited

U.S. PATENT DOCUMENTS

| | | | | |
|---|---|---|---|---|
| 6,085,035 A * | 7/2000 | Ungar | ........................... | 709/221 |
| 6,134,706 A | 10/2000 | Carey et al. | | |
| 6,782,410 B1 * | 8/2004 | Bhagat et al. | ................. | 709/201 |
| 6,898,596 B2 * | 5/2005 | Aikens et al. | ................. | 707/758 |
| 7,499,914 B2 * | 3/2009 | Diab et al. | ........................... | 1/1 |
| 7,533,230 B2 * | 5/2009 | Glover et al. | ................. | 711/165 |
| 7,603,440 B1 * | 10/2009 | Grabowski et al. | ........... | 709/220 |
| 7,698,419 B2 | 4/2010 | Flores et al. | | |
| 2003/0177197 A1 * | 9/2003 | de Bonet et al. | ............. | 709/213 |
| 2005/0005146 A1 | 1/2005 | Kryeziu | | |
| 2006/0005193 A1 | 1/2006 | Illowsky et al. | | |
| 2006/0085799 A1 | 4/2006 | Hoerle et al. | | |
| 2006/0139187 A1 * | 6/2006 | Helfman et al. | ................ | 341/51 |
| 2006/0242638 A1 | 10/2006 | Lew et al. | | |
| 2008/0288524 A1 * | 11/2008 | Dumitru et al. | ........ | 707/999.005 |
| 2009/0113436 A1 | 4/2009 | Cwalina | | |
| 2009/0249322 A1 | 10/2009 | Sugiyama et al. | | |
| 2010/0095279 A1 | 4/2010 | Chou | | |
| 2010/0114960 A1 | 5/2010 | Fusari et al. | | |
| 2010/0235353 A1 * | 9/2010 | Warnock et al. | ............. | 707/723 |
| 2011/0153591 A1 * | 6/2011 | Heller et al. | ................. | 707/713 |

OTHER PUBLICATIONS

IBM, "uid_sql_stmts—Update/Insert/Delete SQL Statements Executed monitor element" Oct. 27, 2006. Retrieved on Sep. 2, 2013 from http://publib.boulder.ibm.com/infocenter/db2luw/v9/topic/com.ibm.db2.udb.admin.doc/doc/r0001335.htm.*

(Continued)

*Primary Examiner* — Cam-Linh Nguyen
(74) *Attorney, Agent, or Firm* — Griffiths & Seaton PLLC

(57) ABSTRACT

Methods, computer systems, and physical computer storage medium for organizing data are provided. A method includes monitoring usage of the data, detecting a pattern in the usage of the data, and assigning a first concrete implementation associated with a first data structure to the data, based, in part, on the detected pattern of usage of the data. The method also includes identifying a change in the pattern of usage of the data, after the step of assigning and switching the first concrete implementation associated with the first data structure to a second concrete implementation, based, in part, on the change in the pattern of usage.

19 Claims, 3 Drawing Sheets

(56) References Cited

OTHER PUBLICATIONS

G Kumar, "Which data structure would you use: TreeMap or HashMap? (Java)", StackOverflow, response posted Aug. 19, 2010. Retrieved on Sep. 2, 2013 from http://stackoverflow.com/questions/302371/which-data-structure-would-you-use-treemap-or-hashmap-java.*

He et al., "Algorithm 897: VTDIRECT95: Serial and parallel codes for the global optimization algorithm direct," ACM Transactions on Mathematical Software, vol. 36, No. 3, Article 17, Publication date: Jul. 2009, 24 pages.

* cited by examiner

METHOD, COMPUTER SYSTEM, AND PHYSICAL COMPUTER STORAGE MEDIUM FOR ORGANIZING DATA INTO DATA STRUCTURES

BACKGROUND OF THE INVENTION

1. Field of the Invention

The present invention relates in general to methods, computer systems, and physical computer storage media comprising a computer program product for organizing data into data structures.

2. Description of the Related Art

Computer software, or simply software, is a general term used to describe a collection of computer programs, procedures, and documentation that perform tasks in a computing environment. Computer software is generally stored on a computer data storage system, and computer data storage in the system is used by the software for a variety of purposes. For example, a file including information may be stored in a data storage system, and computer software may use information contained in the file.

Different types of computer software are developed to operate a computer system. For instance, system software, such as operating systems, interface with hardware to provide the necessary services for application software, middleware controls and coordinates distributed systems, and application software, such as word processors, perform productive tasks for users.

In the case of user interactive computer software such as application software, developers typically design the application according to a perception of how the user may interact with the application. For collection data type applications, such as List in Java, the developer predicts an expected usage by the user of the collected data. The developer then chooses a data structure for the expected usage and develops code (i.e., a concrete implementation) to implement functionality according to the chosen data structure.

In one example, LogRecords from a logfile are sorted by time stamp and thus, a list used to store the LogRecords is sorted by time stamp. The developer predicts that when the user wants to retrieve a particular entry from the list, the user will specify a time range to view including the time stamp of the particular entry. Accordingly, the developer organizes the list into a linked list data structure, an array backed list data structure or another type of data structure. Typically, the code organizing the list into the data structure is written such that the data structure is static.

SUMMARY OF THE INVENTION

Although the aforementioned known types of data structures provide adequate data retrieval performance, the method by which data is structured can be improved. For example, linked list data structures are useful for initial organization of data. However, entries organized within the linked lists may be difficult to search and randomly access. In contrast, array backed list data structures are relatively easy to search and randomly access; however, such data structures may not be easily initiated. Because the structure into which the entries is to be organized is pre-determined before the user uses the data, system performance may not be optimized.

Accordingly, there is a need for a method of organizing data that is relatively easier to use than conventional data organization systems and/or structures. Moreover, it is desirable to have a method of organizing data that can be used to initialize data and/or provide improved searching and/or random access of the data if desired by the user. Additionally, it is desirable for the list implementation be dynamic such that actual usage of the data determines which data structure should be implemented to thereby improve performance of the organization under varied usage conditions.

The present invention provides an improved method for organizing data. In an embodiment, by way of example only, the method includes monitoring usage of the data, detecting a pattern in the usage of the data, and assigning a first concrete implementation associated with a first data structure to the data, based, in part, on the detected pattern of usage of the data.

The present invention further provides a computer system for organizing data. In an embodiment, by way of example only, the computer system includes an application programming interface (API), a usage recording component, an implementation switching component, and a concrete implementation component. The API is configured to define a plurality of operations to be performed on data to make up a usage of the data. The usage recording component is configured to record the operations performed on the data. The implementation switching component is configured to monitor usage of the data to detect a pattern of usage, to retrieve a first set of conditions under which a corresponding concrete implementation becomes active, to determine whether the first set of conditions are met by the pattern of usage of the data, and to assign the corresponding concrete implementation associated with a data structure, if the first set or conditions are met. The concrete implementation component is configured to execute the operations in the API in accordance with the corresponding concrete implementation associated with the data structure.

In another embodiment, by way of example only, the present invention further provides a physical computer storage medium comprising a computer program product method for organizing data. The physical computer storage medium includes computer code for monitoring usage of data, computer code for detecting a pattern in the usage of the data, and computer code for assigning a first concrete implementation associate with a data structure, based, in part, on the detected pattern of usage of the data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Methods, computer systems, and physical computer storage media have now been provided that are configured to dynamically organize data into data structures by evaluating actual usage of the data by a user. The methods by which the computer systems operate and that are embodied by the physical computer storage media can be used to initialize data and/or provide improved searching and/or random access of the data if desired by the user. The method generally includes monitoring usage of the data, detecting a pattern in the usage of the data, and assigning a first concrete implementation associated with a first data structure to the data, based, in part, on the detected pattern of usage of the data, and can be performed using any one of numerous types of computer systems.

Figure 1:
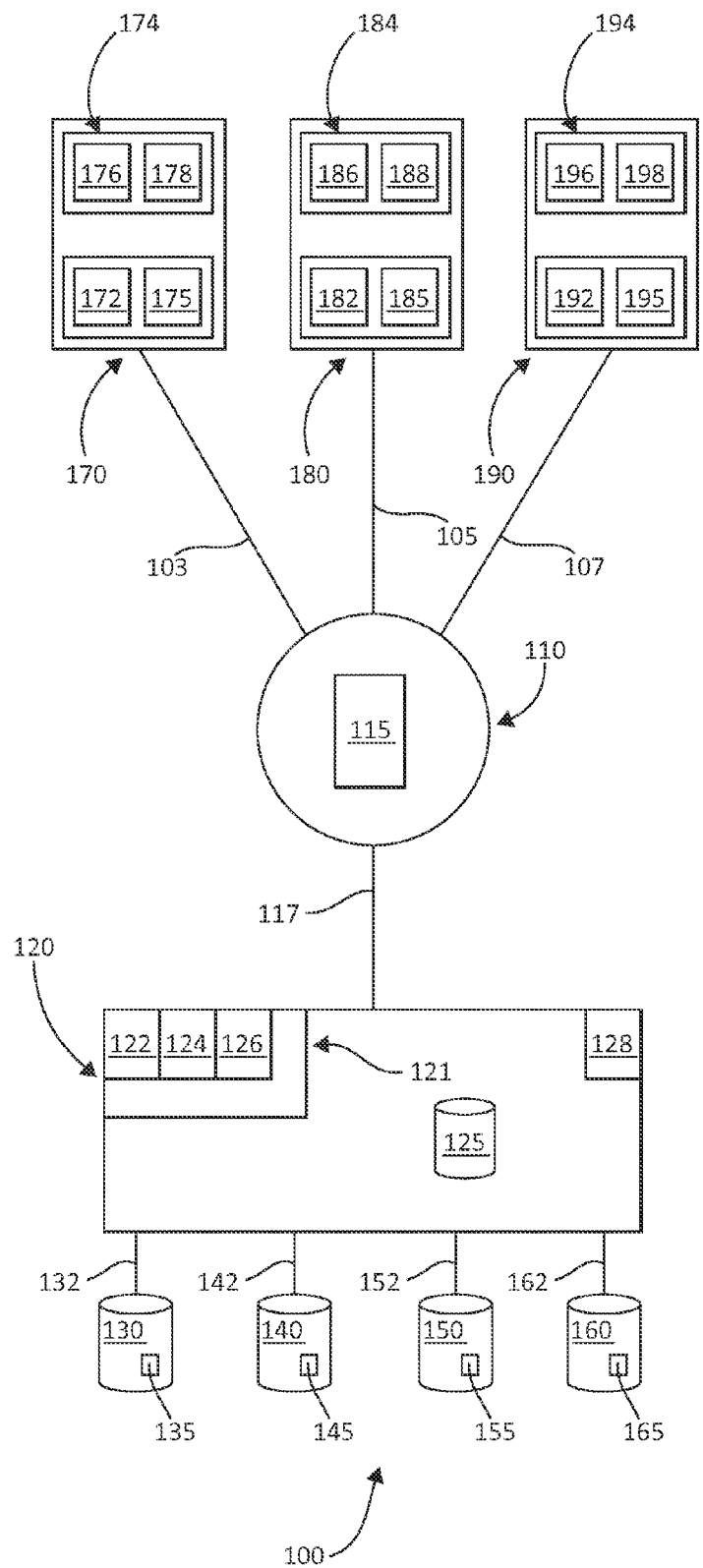
FIG. 1 is a block diagram showing one embodiment of a data storage system according to an embodiment.

In the illustrated embodiment of FIG. 1, data storage system 100 can perform the method of the present invention. Data storage system 100 comprises storage controller 120 and data storage media 130, 140, 150, and 160. Storage controller 120 communicates with data storage media 130, 140, 150, and 160, via I/O protocols 132, 142, 152, and 162, respectively. I/O protocols 132, 142, 152, and 162, may comprise any sort of I/O protocol, including without limitation a fiber channel loop, SCSI (Small Computer System Interface), iSCSI (Internet SCSI), SAS (Serial Attach SCSI), Fiber Channel, SCSI over Fiber Channel, Ethernet, Fiber Channel over Ethernet, Infiniband, and SATA (Serial ATA).

The term "physical computer storage medium" is defined herein as a data storage medium in combination with the hardware, firmware, and/or software, needed to write information to, and read information from, that data storage medium. In certain embodiments, the physical computer storage medium comprises a magnetic data storage medium, such as and without limitation a magnetic disk, magnetic tape, and the like. In certain embodiments, the physical computer storage medium comprises an optical data storage medium, such as and without limitation a CD, DVD (Digital Versatile Disk), HD-DVD (High Definition DVD), BD (Blue-Ray Disk) and the like. In certain embodiments, the physical computer storage medium comprises an electronic data storage medium, such as and without limitation a PROM, EPROM, EEPROM, Flash PROM, compact flash, smartmedia, and the like. In certain embodiments, the physical computer storage medium comprises a holographic data storage medium.

Storage controller 120 is in communication with host computers 170, 180, and 190. As a general matter, host computers 170, 180, and 190, each comprises a computer system, such as a mainframe, personal computer, workstation, and combinations thereof, including an operating system such as Windows®, AIX®, Unix®, MVS®, LINUX®, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 170, 180, and/or 190, further includes a storage management module 172, 182, 192, respectively. In certain embodiments, storage management modules 172, 182, and 192, may include the functionality of storage management type programs known in the art that manage the transfer of data to and from a data storage and retrieval system, such as for example and without limitation the IBM DFSMS implemented in the IBM MVS operating system.

Storage management modules 172, 182, and 192 may be implemented as a hardware circuit comprising custom VLSI circuits or gate arrays, off-the-shelf semiconductors such as logic chips, transistors, or other discrete components. Storage management modules 172, 182, and 192 may also be implemented in programmable hardware devices such as field programmable gate arrays, programmable array logic, programmable logic devices, or the like.

Storage management modules 172, 182, and 192 may also be implemented in software for execution by various types of processors. An identified module of executable code may, for instance, comprise one or more physical or logical blocks of computer instructions which may, for instance, be organized as an object, procedure, or function. Nevertheless, the executables of an identified storage management module need not be physically collocated, but may comprise disparate instructions stored in different locations which, when joined logically together, comprise the module and achieve the stated purpose for the module A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Storage controller 120 comprises processor 128, computer readable medium 121, microcode 122 written to computer readable medium 121, and instructions 124 written to computer readable medium 121. Processor 128 utilizes microcode 122 to operate storage controller 120. Host computers 170, 180, and 190, are connected to fabric 110 utilizing I/O protocols 103, 105, and 107, respectively. I/O protocols 103, 105, and 107, may be any type of I/O protocol; for example, a Fiber Channel ("FC") loop, a direct attachment to fabric 110 or one or more signal lines used by host computers 170, 180, and 190, to transfer information to and from fabric 110.

Fabric 110 includes, for example, one or more FC switches 115. Those one or more switches 115 comprise one or more conventional router switches. One or more switches 115 interconnect host computers 170, 180, and 190, to storage controller 120 via I/O protocol 117. I/O protocol 117 may comprise any type of I/O interface, for example, a Fiber Channel, Infiniband, Gigabit Ethernet, Ethernet, TCP/IP, iSCSI, SCSI I/O interface or one or more signal lines used by FC switch 115 to transfer information through to and from storage controller 120, and subsequently data storage media 130, 140, 150, and 160. In other embodiments, one or more host computers, such as for example and without limitation host computers 170, 180, and 190, communicate directly with storage controller 120 using I/O protocols 103, 105, and 107, respectively.

Figure 2:
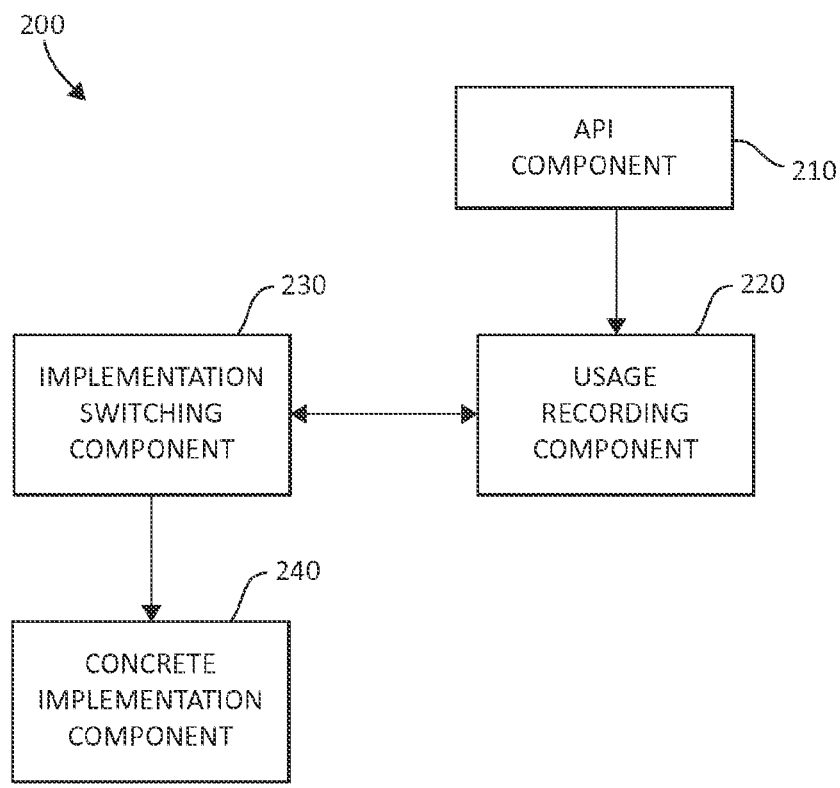
FIG. 2 is a schematic of a computer system for organizing data into data structures, according to an embodiment.

As noted above, storage management modules 172, 182, and 192, are utilized to store and delete data sets on a physical computer storage medium and can comprise executable code or operational data that is organized within any suitable type of data structure. To manage data dynamically according to the present invention, a computer system 200 is included for operating the data storage system 100. A schematic of a computer system 200 is illustrated in FIG. 2, according to an embodiment. Computer system 200, made up of software, includes an application programming interface (API) 210, a usage recording component 220, an implementation switching component 230, and concrete implementation component 240. The API 210 is configured to define a plurality of operations to be performed on data to make up a usage of the data. The operations defined by the API 210 include, but are not limited to operations that are performed on a data structure, including but not limited to well-known functions such as enqueue on a Queue, push on a Stack, and getParent on TreeNode. Each operation performed on the data comprises a usage event, and a plurality of usage events provides a usage of the data. To provide an interface to a user, the API 210 is further configured to be receive functions calls from other parts of the software of the computer system 200 are able to make function calls to the functions that comprise the API.

The API 210 communicates with the usage recording component 220. In an embodiment, the API 210 communicates with the usage recording component 220 via shared memory, registers, buses and the like. The usage recording component 220 is configured to record the operations performed on the data by the user via the API 210. In certain embodiments, the usage recording component 220 records add and/or remove events. In other embodiments, the usage recording component 220 tracks operations performed on the API 210. In still other embodiments, the usage recording component 220 is configured to track composite data from the operations performed on the data. For example, the composite data can comprise a total number of events making up the operations performed on the data, a frequency of one or more events occurring among the operations performed on the data and/or a ratio of occurrences between selected events. In any case, a record of the collected recorded operations is used in a determination as to which data structure is to be assigned to the recorded operations.

The implementation switching component 230 is configured to monitor usage of the data to detect a pattern of usage. Additionally, the implementation switching component 230 retrieves a first set of conditions under which a corresponding concrete implementation becomes active to determine whether the first set of conditions are met by the pattern of usage of the data. If the first set of conditions is met, the implementation switching component 230 assigns the corresponding concrete implementation associated with a data structure. It will be appreciated that logic is used to determine if the first set of conditions is met. In another embodiment, the implementation switching component 230 is further configured to identify a change in the pattern of usage and to switch the corresponding concrete implementation associated with the data structure to another concrete implementation, based, in part on the change in the pattern of usage.

The concrete implementation component 240 communicates with the implementation switching component 230. The concrete implementation component 240 implements logic for importing data from another concrete implementation and logic to execute operations in the API 210. Specifically, the concrete implementation component 240 is configured to execute the operations in the API 210 in accordance with the corresponding concrete implementation associated with the data structure assigned by the implementation switching component 230. For example, the concrete implementation component 240 is further configured to import data from the corresponding concrete implementation associated with the data structure and transforming the imported data into a local implementation.

In an embodiment in which the implementation switching component 230 detects a change in the pattern of usage of the data and activates a new concrete implementation, the concrete implementation component 240 can be configured to import data from the previously-active concrete implementation and to transform the retrieved data into the new concrete implementation. As data is imported and transformed, the previously-active concrete implementation remains active and API calls continue to be routed thereto. However, after the data import is completed, the new concrete implementation and subsequent API calls are then routed to the new concrete implementation. In another embodiment, data import and routing API calls to the new concrete implementation can occur simultaneously.

Figure 3:
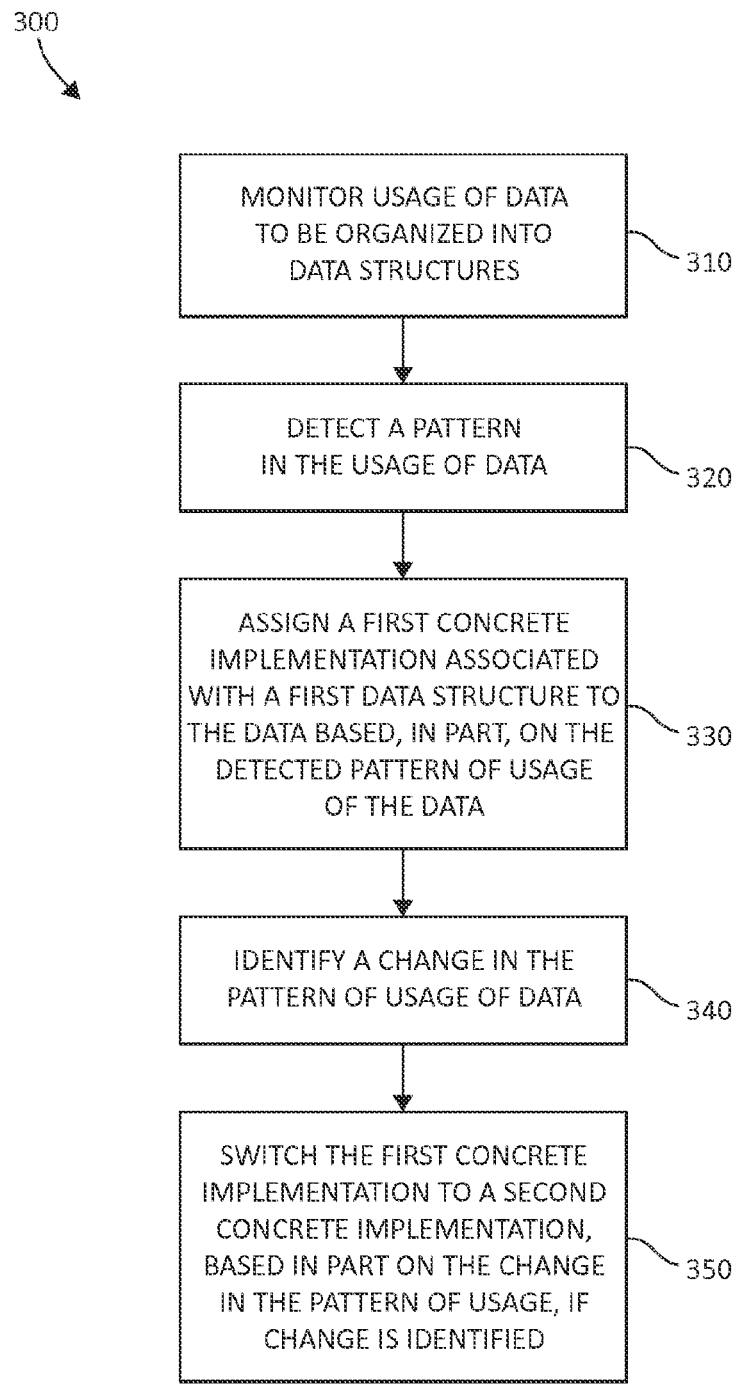
FIG. 3 a flow diagram of a method for organizing data into data structures, according to an embodiment.

FIG. 3 is a flowchart of a method 300 for organizing data into data structures, according to an embodiment. Generally, the method 300 begins by monitoring usage of the data to be organized into data structures, step 310. Step 310 is performed by the usage recording component 220 (FIG. 2), in an embodiment. According to an embodiment, step 310 includes recording a first plurality of operations performed on the data. Additionally, step 310 can include tracking composite data based on analyzing the plurality of operations. The composite data comprises a total number of occurrences of a first event within the plurality of operations, a ratio of occurrences between a first event and a second event within the plurality of operations or another type of composite data of interest to the user.

A pattern in the usage of the data is detected, step 320. Next, a first concrete implementation associated with a first data structure is assigned to the data, based, in part, on the detected pattern of usage of the data, step 330. In particular, to identify which data structure should be assigned to the data monitored in steps 310 and 320, a first set of conditions under which the first concrete implementation is activated is retrieved. Then, a determination is made as to whether the detected pattern of usage meets the first set of conditions, and the first concrete implementation is assigned to the first data structure, if the first set of conditions is met. Steps 320 and 330 are performed by the implementation switching component 230 (FIG. 2).

If a change in the pattern of usage of the data is identified, after the step of assigning (e.g., step 330), step 340, the first concrete implementation associated with the first data structure is switched to a second concrete implementation, based, in part, on the change in the pattern of usage, step 350. As used herein, the term "second concrete implementation" is defined as a concrete implementation of a data structure that is different from that of the first concrete implementation. During step 340, the data associated with the first concrete implementation associated with the first data structure is imported and transformed into a local implementation, in an embodiment. Calls can be routed to the first concrete implementation during step 340. During step 350, calls can be routed to the second concrete implementation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for organizing data into data structures, the method comprising:
    monitoring usage of the data using a processing device;
    detecting a pattern in the usage of the data using the processing device, the pattern of usage based on a plurality of data remove events and data add events;
    assigning a first concrete implementation associated with a first data structure to the data, based, in part, on the detected pattern of usage of the data using the processing device;
    identifying a change in the pattern of usage of the data using the processing device, after the step of assigning;
    switching, using the processing device, the first concrete implementation associated with the first data structure to a second concrete implementation, based, in part, on the change in the pattern of usage, the second concrete implementation associated with a second data structure that is different from the first data structure;
    importing data from the first concrete implementation and transforming the imported data into the second concrete implementation using the processing device; and
    continuing to route calls to the first concrete implementation during the importing with the processing device.

2. The method of claim 1, wherein:
    the step of monitoring comprises recording a first plurality of operations performed on the data, before the step of detecting; and
    the step of detecting further comprises detecting the pattern, based, in part, on the recorded first plurality of operations.

3. The method of claim 2, wherein the step of recording further comprises tracking composite data based on analyzing the plurality of operations.

4. The method of claim 3, wherein the composite data comprises a total number of occurrences of a first event within the plurality of operations.

5. The method of claim 3, wherein the composite data comprises a ratio of occurrences between a first event and a second event within the plurality of operations.

6. The method of claim 1, further comprising importing the data associated with the first concrete implementation associated with the first data structure and transforming the imported data into a local implementation, before the step of switching.

7. The method of claim 6, wherein the step of switching comprises routing calls to the second concrete implementation after the step of importing.

8. The method of claim 1, further comprising:
retrieving a first set of conditions under which the first concrete implementation is activated, after the step of detecting;
determining whether the detected pattern of usage meets the first set of conditions; and
assigning the first concrete implementation to the first data structure, if the first set of conditions are met.

9. The method of claim 1, wherein the pattern is based on one of:
a total number of add events, a total number of remove events, or a total number of add and remove events;
a frequency of add events, a frequency of remove events, or a frequency of add and remove events; and
a ratio of occurrence between add and remove events.

10. The method of claim 1, wherein the pattern is based on two of:
a total number of add events, a total number of remove events, or a total number of add and remove events;
a frequency of add events, a frequency of remove events, or a frequency of add and remove events; and
a ratio of occurrence between add and remove events.

11. The method of claim 1, wherein the pattern is based on each of:
a total number of add events, a total number of remove events, or a total number of add and remove events;
a frequency of add events, a frequency of remove events, or a frequency of add and remove events; and
a ratio of occurrence between add and remove events.

12. A computer system comprising:
a memory device; and
a processing device coupled to the memory device, the processing device executing:
an application performance interface (API) configured to define a plurality of operations to be performed on data to make up a usage of the data;
a usage recording component configured to record the operations performed on the data;
an implementation switching component configured to monitor usage of the data to detect a pattern of usage based on a plurality of data remove events and data add events, to retrieve a first set of conditions under which a corresponding first concrete implementation becomes active, to determine whether the first set of conditions are met by the pattern of usage of the data, to assign the first concrete implementation associated with a first data structure, if the first set of conditions are met, to identify a change in the pattern of usage of the data, after assigning, and to switch the first concrete implementation associated with the first data structure to a second concrete implementation, based, in part, on the change in the pattern of usage, the second concrete implementation associated with a second data structure that is different from the first data structure; and
a concrete implementation component configured to execute the operations in the API in accordance with the first concrete implementation associated with the first data structure, to import data from the first concrete implementation and to transform the imported data into the second concrete implementation, and to continue to route calls to the first concrete implementation during the importing.

13. The computer system of claim 12, wherein the API is further configured to be visible to a user.

14. The computer system of claim 12, wherein the usage recording component is further configured to record add events and remove events.

15. The computer system of claim 12, wherein the usage recording component is further configured to track composite data comprising events making up the operations performed on the data.

16. The computer system of claim 12, wherein the concrete implementation component is further configured to import data from the first concrete implementation associated with the first data structure and to transform the imported data into a local implementation.

17. A non-transitory physical computer storage medium comprising a computer program product method for organizing data, the physical computer storage medium comprising:
computer code for monitoring usage of data;
computer code for detecting a pattern in the usage of the data, the pattern of usage based on a plurality of data remove events and data add events;
computer code for assigning a first concrete implementation associate with a data structure, based, in part, on the detected pattern of usage of the data;
computer code for identifying a change in the pattern of usage of the data, after the assigning;
computer code for switching the first concrete implementation associated with the first data structure to a second concrete implementation, based, in part, on the change in the pattern of usage, the second concrete implementation associated with a second data structure that is different from the first data structure;
computer code for importing data from the first concrete implementation and transforming the imported data into the second concrete implementation; and
computer code for continuing to route calls to the first concrete implementation during the importing.

18. The physical computer storage medium of claim 17, further comprising:
computer code for recording a first plurality of operations performed on the data; and
computer code for detecting the pattern, based, in part, on the recorded first plurality of operations.

19. The physical computer storage medium of claim 17, further comprising:
computer code for retrieving a first set of conditions under which the first concrete implementation is activated;
computer code for determining whether the detected pattern of usage meets the first set of conditions; and
computer code for assigning the first concrete implementation associated with the data structure, if the first set of conditions are met.

* * * * *